Inventors
Walter H. Page
Ralph E. Wallace
John F. Swift
Floyd B. Harman
Attorney

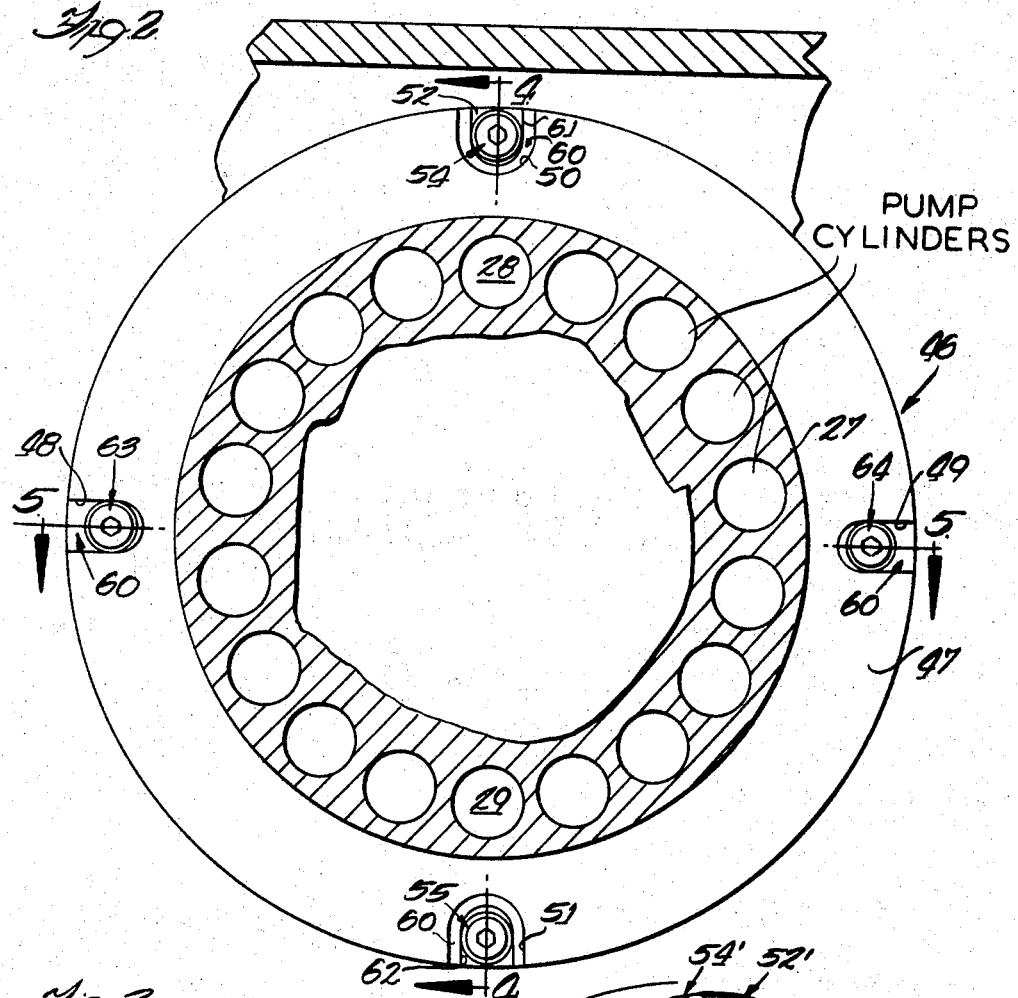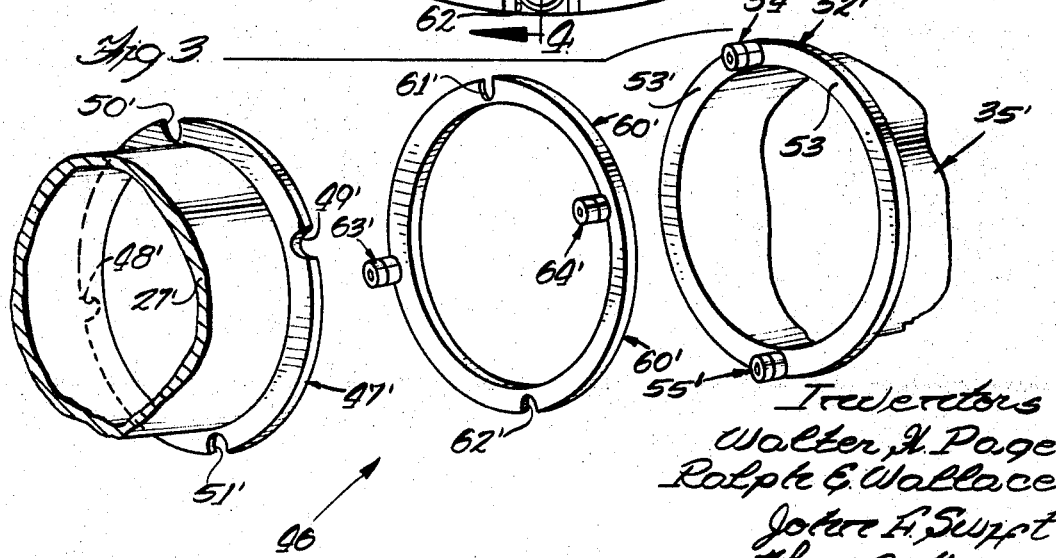

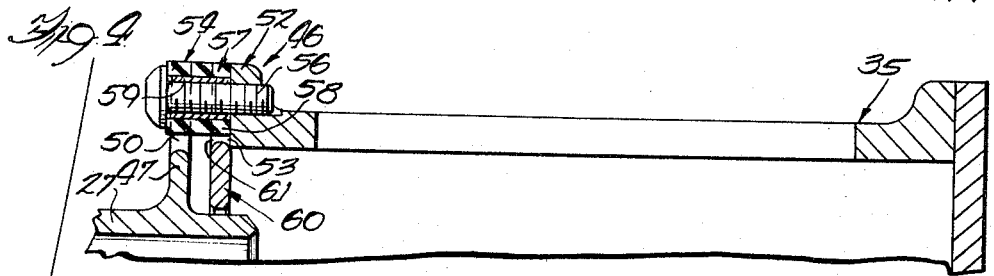
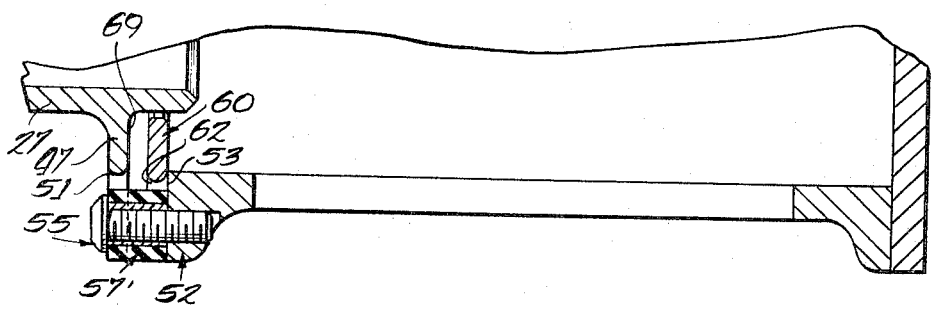
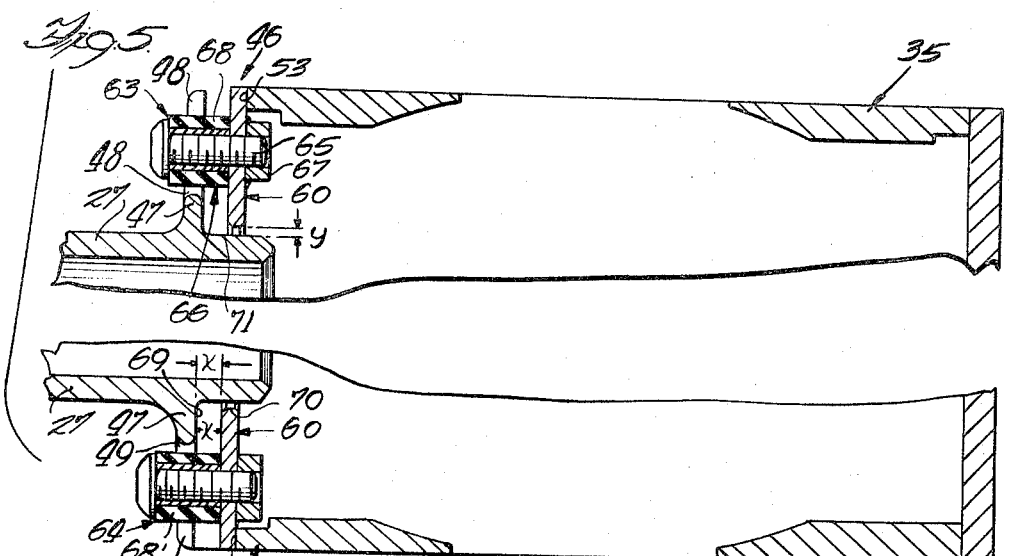
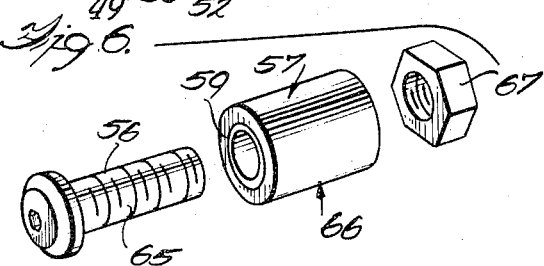

United States Patent Office 3,304,715
Patented Feb. 21, 1967

3,304,715
TORQUE TRANSMITTING MECHANISM IN AN AXIAL PISTON TYPE HYDRAULIC POWER TRANSMISSION UNIT
Walter H. Page and Ralph E. Wallace, Elmhurst, and John F. Swift, Chicago, Ill., assignors to International Harvester Company, Chicago, Ill., a corporation of New Jersey
Filed May 21, 1965, Ser. No. 457,645
20 Claims. (Cl. 60—53)

This invention relates to torque transmitting mechanism for connecting the cylinder block of an axial piston type pump or motor unit to its associated driving or driven rotatable shaft. More in particular this invention relates to torque transmitting mechanism for transmitting torque between the cylinder block and its associated rotatable shaft of an axial piston type hydraulic unit whereby no substantial radial or transverse loads are transmitted from the driving means or driven means to the cylinder block thereby minimizing fluid leakage at the valve interface of the cylinder block.

In general the present invention provides means for allowing the cylinder block of an axial piston type pump or motor unit to follow or float on the distributor or valve plate despite stack up tolerances of the parts, misalignments or deflection. It makes possible lower costs and improved performance.

Although the present invention may be advantageously utilized in swash plate axial piston type hydraulic units such as pumps and motors it is particularly useful in hydromechanical power transmissions of the type described in United States Letters Patent Nos. 3,157,995 and 3,151,456 issued to John F. Swift. In such hydraulic units at least one cylinder block abuts a valve plate which valve plate functions to connect communicatively the high pressure and low pressure sides of the fluid working circuit to the cylinder block in operative relation. Since there is relative rotation between the valve plate and the cylinder block there must be present opposing axial forces sufficient to hold the cylinder block against the valve plate in slidable sealing relation. Now, if a transverse or radial force is applied to, for example, the cylinder block it is readily apparent that the cylinder block may tend to cock thus resulting in a separation of the cylinder block from the valve plate at the interface. Such separation opens seriously a radial fluid leakage path wherein fluid from the hydraulic unit's working circuit escapes thus lowering the efficiency of the hydraulic unit. Furthermore, such cocking encourages scuffing or scoring of the valve plate and cylinder block at their interfaces. Accordingly, it is a prime object of the present invention to provide torque transmitting means for a cylinder block of an axial piston type hydraulic unit wherein the torque transmitting means prevents radial or transverse loads or forces from being transmitted therethrough to the cylinder block.

A further important object of the invention is to provide a torque transmitting means according to the preceding object to prevent or minimize certain fluid leakage losses in an axial piston type hydraulic unit by preventing radial or transverse force moments from being imposed upon a cylinder block thereof from the drive connection of its associated shaft which forces if imposed upon a cylinder block are sufficient to separate the interface abutment of the cylinder block to its associated valve plate thereby permitting fluid under pressure in the working circuit of the hydraulic unit to escape.

Another important object of the present invention is to provide a torque transmitting means according to the preceding objects associated with a cylinder block of a hydromechanical power transmission employing axial piston type hydraulic units.

These and other desirable objects inherent in and encompassed by the invention will become more apparent from the ensuing description of a preferred embodiment, the appended claims, and the annexed drawings wherein:

FIGURE 1 is a side elevation, partly in section and partly broken away, showing the general arrangement of axial piston type hydraulic units in a hydromechanical power transmission as an exemplary environment, which transmission, except for the present invention, is fully described in the copending patent application of John F. Swift and William Margolin, Ser. No. 384,472, filed on July 22, 1964, now Patent No. 3,213,620, issued Oct. 26, 1965 and assigned to the same assignee herein;

FIGURE 2 is an enlarged transverse sectional view, partly broken away, taken in line 2—2 of FIGURE 1 showing details of the torque transmitting means of the present invention;

FIGURE 3 is a perspective view of the three elements of the torque transmitting means of the present invention in dis-assembled form showing the basic concept thereof;

FIGURE 4 is a sectional view, partly broken away taken on line 4—4 of FIGURE 2 showing structural details of the invention.

FIGURE 5 is a sectional view partly broken away, taken on line 5—5 of FIGURE 2 illustrating additional structural details of the invention; and FIGURE 6 is a perspective view of the components of a pin assembly in dis-assembled form.

Figure 1:
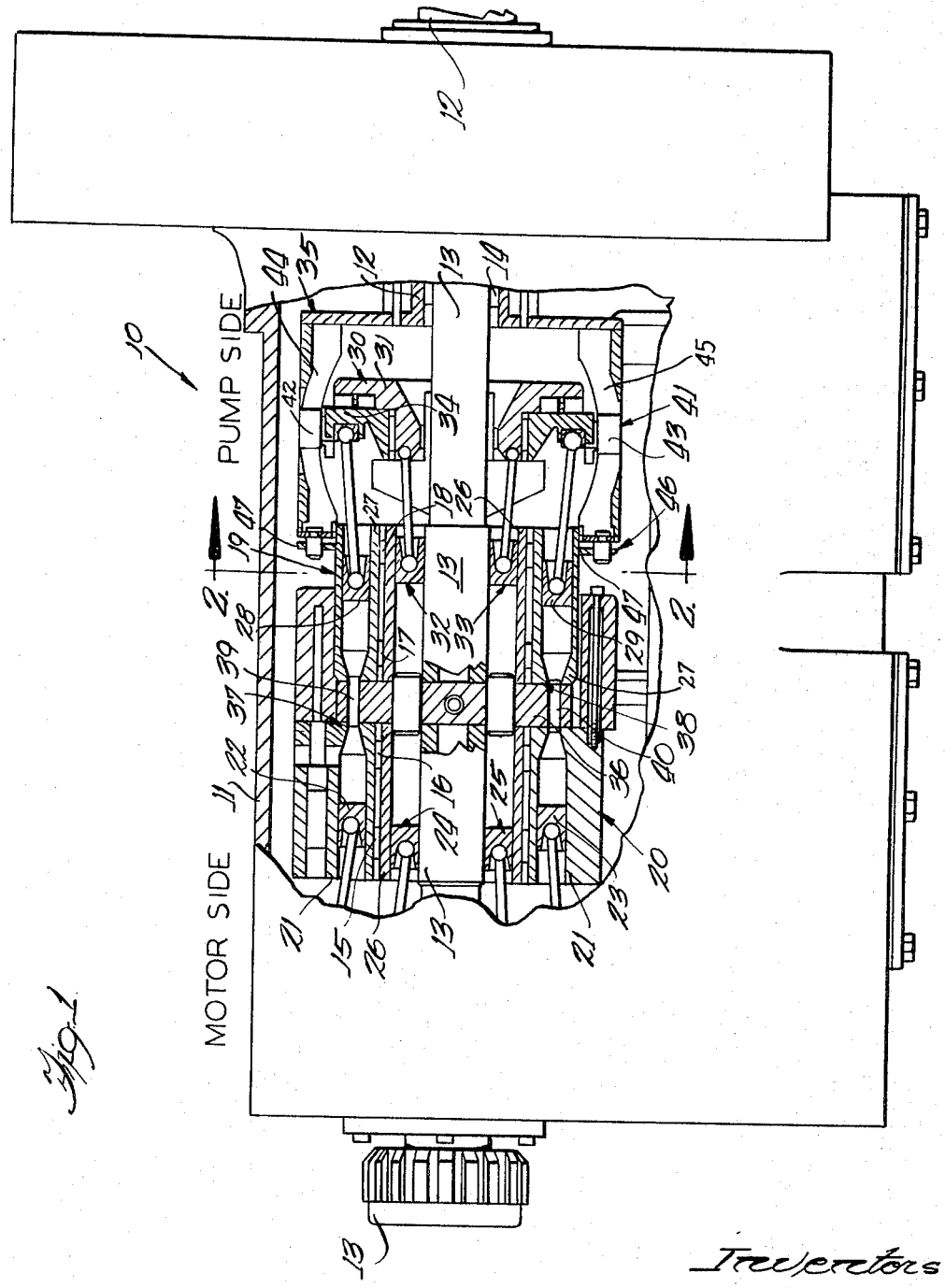

With continued reference to the drawings the numeral 10 indicates generally a hydromechanical power transmission which incorporates the features and construction of the present invention.

Hydromechanical power transmissions differ from hydrostatic power transmissions in at least one major respect. In a hydromechanical power transmission the power delivered to the input shaft is split or divided into two paths, one being hydraulic and the other mechanical, which are recombined and delivered to the output shaft. Thus part of the drive connection between the input shaft and the output shaft is mechanical and the balance hydraulic. From this it will be apparent that a hydromechanical power transmission includes some form of mechanical force reaction means associated with at least one of the hydraulic units so that the reactive force of the hydraulic unit is utilized mechanically as one of the above mentioned power paths between the input shaft and the output shaft. When the transmission 10 is in 1:1 speed ratio forward (i.e., direct drive) the hydraulic units are hydraulically locked (i.e., no fluid flow) and the hydraulic power path delivers zero power resulting in that all power is delivered through the mechanical power path. Thus a hydromechanical power transmission is capable of transmitting power without flow of hydraulic fluid. At other speed ratios the power transmitted is partly hydraulic and the balance mechanical in varying proportions depending upon the speed ratio as is well known.

Hydrostatic power transmissions, to the contrary, have but one power path; hydraulic. Thus the transmission of power from the input shaft to the output shaft is entirely dependent upon the flow of fluid under pressure.

Since hydraulic power losses are greater than that of mechanical losses, as is well known, it can be seen that the efficiency of hydromechanical power transmissions is higher than that of hydrostatic transmissions.

Although the present invention may be advantageously utilized in axial piston type pumps and motors including hydrostatic power transmissions employing pumps and motors of the axial piston type, it has particular advantages when employed in hydromechanical power transmissions of the types hereinbefore referred.

Referring to FIGURE 1 the hydromechanical power transmission 10 includes housing 11, input shaft 12, and output shaft 13. The input shaft 12 is supported in the housing 11 by suitable bearings (not shown), and is provided with a recess portion in the inner end thereof to receive in journalled relation, such as by bearing 14, the rightward end portion of the output shaft 13. The leftward end portion of the output shaft 13 is supported by suitable bearing means in the housing 11. The output shaft 13 is also further supported centrally by bearings 15 and 16, as will become apparent later herein.

The transmission 10 includes an axial piston hydraulic pump, generally indicated at 19, and an axial piston hydraulic motor, generally indicated at 20. The motor cylinder block 21 is stationary (i.e rigid with the housing 11) and its plurality of axial pistons, two of which are shown at 22 and 23, are in drive relation with a motor swash plate (not shown) which swash plate is mounted on the output shaft 13 in drive relation. A pair of hydraulic rams 24, 25, are carried by the output shaft 13 disposed in 180° relation with respect to each other and positioned for selectively controlling the angle of inclination of the motor swash plate (not shown). Thus the fluid displacement of the axial piston motor 20 may be selectively controlled. Since the casing 26 for the hydraulic rams 24, 25 rotates with the output shaft 13 and the motor cylinder block 21 is stationary, the bearings 15 and 16 partly support the output shaft 13.

The pump cylinder block member 27 rotates with the input shaft 12 with a rotatable drive device by means which will be described later herein. The pump cylinder block 27 includes a plurality of axial pistons, two of which are shown at 28 and 29, which are in drive relation with a pump swash plate indicated generally at 30 which, similar to the motor swash plate, is also mounted on the output shaft 13.

The pump swash plate 30 includes a backing plate 31 mounted on and constrained for rotation with the output shaft 13 but tiltable selectively on a transverse axis for controlling the displacement of the pump 19. A pair of hydraulic rams 32, 33 similar to the hydraulic rams 24, 25, are carried by the output shaft 13 disposed in 180° relation with respect to each other and positioned to adjust controllably the angle of inclination of the backing of plate 31 thereby controlling the tilt angle of the swash plate 30. Since the tilt angle of swash plate 30 is selectively controllable the displacement of the pump 19 is selectively controlled. However, it should be pointed out that insofar as the present invention is concerned it is immaterial whether the angle of inclination of the swash plate 30 is fixed or adjustable.

The swash plate 30 also includes a thrust ring 34 in journalled relation with respect to the backing plate 31. The thrust ring 34 rotates with the input shaft 12 and is supported by a bell-shaped drive member, indicated at 35, which is connected to the input shaft 12 in drive relation. The drive member 35 connected to the input shaft 12 thus forms a rotatable drive device. The means for supporting the thrust ring 34 by the bell-shaped drive member 35 may be in the form of a conventional type universal joint connection such as a Cardan joint.

Constrained for rotation with output shaft 13 is a flange or valve plate member 36 which slidably abuts the inner faces of the motor cylinder block 21 and pump cylinder block 27 forming valve interfaces respectively indicated at 37 and 38. The valve plate 36 is provided with conventional arcuate openings or passages 39 and 40, sometimes referred to as "kidney valves," which communicatively connect the cylinders of the pump 19 with the cylinders of the motor 20 in operative relation. Thus one of the valve openings 39, 40 will be at high fluid pressure and the other at low fluid pressure during operation.

Considering the pump 19 it will be apparent that if the pump cylinder block 27 is subjected to any lateral or transverse force moment, the load upon supporting bearings 17 will be different than that upon bearing 18. Thus the pump cylinder block 27 may be displaced angularly or cocked to an extent permissible by the tolerances in bearings 17 and 18. This cocking of the pump cylinder block 27 now causes a separation thereof with respect to the valve plate 36 at the interface 38 and possibly the interface 37 too. Such separation at either or both interfaces 37, 38 results in fluid losses escaping radially therethrough from the arcuate passages 39, 40 of the working hydraulic circuit between the pump 19 and motor 20 thus adversely affecting the efficiency of the transmission 10. In addition the contacting surfaces of valve plate 36 and both cylinder blocks 21 and 27 may be damaged by scoring or scuffing due to high contact axial forces which will now be briefly described.

In FIGURE 1 it will be seen that the cylinder bores in the pump cylinder block 27 containing the pump pistons (e.g. pistons 28 and 29) are larger in diameter than the fluid ports in the block 27 communicating with the arcuate openings 39, 40 of the valve plate 36 at the interface 38. Thus the fluid pressure in the arcuate openings 39 and 40 presents an axial force urging separation of the pump cylinder block 27 from the valve plate 36 at the interface 38. However, the diameter of the pump pistons (e.g. pistons 28 and 29) is much larger than the fluid ports in the block 27 leading to the arcuate openings 39, 40. Therefore, the leftward force of the pump pistons due to reaction against the thrust ring 34 of swash plate 30 exerts a greater force urging the pump cylinder block 27 leftwardly into sliding engagement with the valve plate 36. Thus the net result is that the pump cylinder block 27 is urged leftwardly against the valve plate 36 in sealing relation at the interface 38. From this it will be apparent that if the cylinder block 27 is not subjected to a transverse force moment tending to clock the block 27 the interface 38 would remain in close abutting relation wherein the leakage of fluid radially at the interface 38 would be little or none. Unfortunately in prior known constructions transverse force moments are imposed upon the pump cylinder block such as block 27 which cock the block 27 to the extent permitted by manufacturing tolerances existing in its support means such as bearings 17 and 18. The occurrence of such transverse force moments may stem from several sources, one of which will now be described in reference to the pump 19.

It was previously mentioned that the thrust ring 34 of the pump swash plate 30 rotates with and is supported by the bell-shaped drive member 35. The supporting connection between the thrust ring 34 and the bell-shaped drive member 35 may be a form of a universal joint indicated generally at 41 in FIGURE 1. For example, a conventional Cardan joint has been used for such purpose. In the embodiment shown the joint 41 comprises a pair of slide blocks 42, 43 pivotally connected to the thrust ring 34. The slide block 42 slides arcuately in a groove 44 disposed longitudinally in the ball-shaped drive member 35. Similarly the slide block 43 slides arcuately in a groove 45 disposed longitudinally in the bell-shaped drive member 35. Thus the thrust ring 34 may swivel so that it can always stay in the same relative relation to the backing plate 31 of the swash plate 30 but rotates with the bell-shaped drive member 35.

It was mentioned previously that one of the arcuate openings 39, 40 was at high fluid pressure and the other at low fluid pressure. Thus approximately one half of the total number of pump cylinders (FIGURE 2) on one side of the cylinder block 27 will be at high fluid pressure and about one half of the total number of pump cylinders on the other side of the block 27 will be at low pressure. From this it will be apparent that the aggregate thrust against about half of the thrust ring 34 will be much higher than the other half and the variation in magnitude will correspond to the speed ratio and load applied to the transmission 10. Thus a transverse force moment is transmitted to the bell-shaped drive member 35. Now in prior known constructions the drive member 35 is connected to the cylinder block 27 rigidly and therefore transverse force moments imposed upon the bell-shaped drive member 35 were transmitted to the pump cylinder block 27. This resulted in slight cocking of the cylinder block 27 which separated it from the valve plate 36 thus causing excessive leakage of fluid radially from the working circuit at the separated interface 38. Therefore, this invention is directed to means for transmitting torque without transmitting transverse force moments to the cylinder block. In the particular embodiment shown in the drawing this invention prevents transverse force moments occuring in the input shaft 12 and its bell-shaped drive member 35 from being transmitted to the cylinder block 27 while at the same time transmits torque so that the cylinder block 27 is constrained for rotation with the bell-shaped member 35 and input shaft 12. The torque transmitting means of the invention will now be described.

The mechanism for a split connection between a rotatable axial piston cylinder block to its associated shaft in drive relation whereby both are constrained for rotation together but excludes transmission to the cylinder block of transverse force moments is the subject matter of this invention. In the embodiment shown in the drawing this connecting mechanism or torque transmitting means is indicated generally by the numeral 46.

Disposed on the pump cylinder block 27 in rigid or integral relation is an annular member 47 having four longitudinal grooves 48, 49, 50 and 51 as best seen in FIGURE 2. It will be observed that the grooves 50 and 51 are positioned in 180° relation with respect to each other and are somewhat larger than the grooves 48 and 49. The grooves 48 and 49 are also positioned in 180° relation with respect to each other and in 90° relation with respect to grooves 50 and 51.

Disposed on the bell-shaped drive member 35 is another annular member indicated generally at 52 which is rigidly connected to or integral with the bell-shaped drive member 35. The annular member 52 includes an annular face 53 as indicated in FIGURES 4 and 5. Referring to FIGURES 2 and 4 it will be seen that the annular member 52 is provided with two pin assemblies, indicated at 54 and 55, positioned in 180° relation. The pin assembly 54 may conveniently be comprised of a machine screw 56 and a sleeve element indicated at 57. The sleeve element 57 may be constructed entirely of metal such as steel but more preferably constructed of an elastomeric or plastic material 58 having at least some resiliency, such as, for example, synthetic buna N rubber or nylon surrounding the outer surface of thin walled metal cylindrical tube 59. If desired the resilient material 58 may be bonded to the cylindrical tube 59. The annular member 52 is provided with a threaded bore adapted to receive the machine screw 56. Thus as shown in FIGURE 4 the pin assembly 54 is secured to the annular member 52 and forms a projection extending from the annular face 53. The pin assembly 55 is constructed and secured to the annular member 52 in the same manner as that just described for the pin assembly 54 and thus forms another projection from the annular face 53. The resilient material 58 thus permits uniform load distribution on the pins 54 and 55.

Referring to FIGURES 2, 4 and 5 it will be seen that between the annular members 47 and 52 is an intermediate ring or annular element indicated at 60. The intermediate ring element 60 is provided with two longitudinal grooves 61 and 62 disposed in 180° relation positioned to receive the projections formed by the pin assemblies 54 and 55, respectively. It will be noted from FIGURE 2 that the outer diameter of the sleeve elements 57 and 57' of the pin asesmblies 54 and 55, respectively, are dimensioned for transverse slidable movement in the longitudinal grooves 61 and 62 respectively. Thus it will be apparent that the bell-shaped drive member 35 and its associated annular member 52 may move radially with respect to the intermediate ring element 60 in a vertical direction as viewed in FIGURE 2 to an extent limited by the radial depth of longitudinal grooves 61 and 62.

Referring again to FIGURES 2 and 5 it will be seen that the intermediate ring member 60 is also provided with two pin assemblies 63 and 64 disposed in 180° relation and rigidly secured thereto. The pin assembly 63 may include a machine screw 65 and a sleeve element 66 similar to the screw 56 and sleeve elements 57 previously described. The screw 65 and sleeve element 66 assembly is secured rigidly to the intermediate ring element 60 by means of a nut 67 welded to one side of the ring element 60 as best seen in FIGURE 5. The pin assembly 63 thus forms a projection extending from the intermediate element 60. The pin assembly 64 is constructed and secured to the intermediate element 60 in the same manner as that just described for the pin assembly 63.

It will be seen from FIGURE 2 that the pin assemblies 63 and 64 are positioned in 90° relation with respect to pin assemblies 54 and 55. The projection formed by the resilient portion 68 of the pin assembly 63 is received by the longitudinal groove 48 of the annular member 47. Similarly the projection formed by the pin assembly 64 is received by the longitudinal groove 49 of the annular member 47. From this it will be apparent that the intermediate ring member 60 may be moved horizontally as viewed in FIGURE 2, with respect to the annular member 47 limited by the radial depth of the longitudinal grooves 48 and 49 or clearance Y of FIGURE 5 whichever is lesser. Again it should be noted that the diameter of the resilient portion 68 and 68' of pin assemblies 63 and 64 should be dimensioned for slidable fit in the longitudinal grooves 48 and 49. As in the case of pins 54 and 55 the resilient portions 68 and 68' permits substantially uniform load distribution on the pins 63 and 64.

Referring now to FIGURE 5 the intermediate ring member 60 is shown flush with or abutting the annular face 53 of the annular member 52 and in axial spaced relation from the annular member 47 by a clearance distance X. However, it is pointed out that the intermediate ring member 60 may be moved axially in the leftward direction as viewed in FIGURES 4 and 5, the distance X until it abuts an annular face 69 of the annular member 47. The value of X should be appropriately chosen consistent with the dimensional characteristics of the hydraulic unit 19. Furthermore, the inner diameter 70 of the intermediate element 60 is slightly larger than the outer diameter 71 of the cylinder block 27 by a clearance distance Y so that the intermediate element 60 may be tilted slightly to an extent limited by the clearance X. This permits some deflection of the bell-shaped drive member 35 without imposing a corresponding deflection or cocking of the cylinder block 27.

FIGURE 3 illustrates diagrammatically the torque transmitting means of this invention in disassembled form wherein equivalent parts described above for the hydraulic unit 19 bear the same numerical designation except primed. From this it will be apparent that upon assembly the pin assemblies 54' and 55' of the annular member 52' engage respectively the longitudinal grooves 61' and 62' of the intermediate element 60'. Thus the bell-shaped drive member 35' may be moved in a first axial plane common to the axes of pin assemblies 54' and 55' limited by the radial depth of the grooves 61' and 62'. However, a direct torque connection between the intermediate element 60' and the bell-shaped drive member 35' exists through engagement of the pins 54' and 55' with the grooves 61' and 62' respectively. If resilient sleeve elements 57, 57' are employed in the pin assemblies 54' and 55' then a slight but insignificant resiliency in torque transmission between the intermediate element 60' and the bell-shaped drive member 35' occurs but the load distribution on the pins 54' and 55' will be substantially equal.

Again referring to FIGURE 3 it will be evident that upon assembly the pin assemblies 63' and 64' of the intermediate element 60' engage respectively the longitudinal grooves 48' and 49' of the annular member 47' associated with the pump cylinder block 27'. Thus the intermediate element 60' may be moved in a second axial plane common to the axes of pin assemblies 63' and 64' limited by the radial depth of the grooves 48' and 49' or the clearance Y of FIGURE 5. The second axial plane is at right angles with respect to the above mentioned first axial plane. It will thus be apparent that a direct torque connection between the intermediate element 60' and the pump cylinder block 27' exists through engagement of the pins 63' and 64' with the grooves 48' and 49' respectively. Again, if resilient sleeve elements 68 and 68' are employed in the pin assemblies 63' and 64' then a slight but insignificant resiliency in torque transmission between the intermediate element 60' and the cylinder block 27' occurs but the load distribution on the pins 63' and 64' will be substantially equal.

From the foregoing it will be evident that upon assembling the components shown in FIGURE 3, there exists a positive torque transmission between the drive member 35' and the pump cylinder block 27'. It will be noted however that while the pins 54' and 55' enter the grooves 50' and 51' respectively, the pins 54' and 55' do not engage the annular member 47' because it will be remembered that the grooves 50' and 51' are larger than the outer diameters of the pins 54' and 55' as is evident from foregoing previous description and from FIGURE 2.

During operation of the pump 19, in the event that the bell-shaped drive member 35 is subjected to transverse force moments by reason of transverse forces occurring on the input shaft 12 (e.g. dynamic unbalance) or resulting from transverse forces arising from the swash plate 30, the bell-shaped drive member 35 is urged to deflect, tilt or cock from the common rotational axis of the input shaft 12 and the output shaft 13. This tilting is usually slight and perhaps limited to the extent of clearances on the supporting bearings. However, these transverse forces are known to exist for it was observed that when the load applied, such as on the pump 19, was increased the rate of loss of fluid also increased but to an extent much greater than would be expected based upon proportion to the load applied and the disproportionate loss of fluid was suspected to occur at the interface 38. This was later confirmed for when the pump 19 was provided with the torque transmitting means 46 of this invention, the fluid losses were lowered greatly and proportional to the applied load as may be normally expected.

Thus from the above the bell-shaped drive member 35, as viewed in FIGURE 1, may tilt in a clockwise (or counterclockwise) direction with respect to the axis of rotation of the shafts 12 and 13. However, the torque transmitting means 46 of this invention prevents transverse force moments of the bell-shaped drive member 35 from being transmitted to the pump cylinder block 27 because the intermediate ring element 60 may tilt with the bell-shaped drive member 35 due to the clearances X and Y as well as the radial depth clearances of the groves 48, 49, 50 and 51. From this it is clear that the torque transmitting means 46 of this invention provides a drive connection between the bell-shaped drive member 35 and the pump cylinder block 27 but avoids transmission to the cylinder block 27 of any transverse force occurring in the bell-shaped drive member 35 thereby substantially eliminating leakage of fluid under pressure at the interface 38.

Having thus described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:
1. A hydraulic unit having a cylinder block member with a plurality of axially movable pistons in cooperative relation with a swash plate, a valve plate member abutting said cylinder block member in pressure seal relation forming an interface for valving fluid to and from said pistons, a rotatable drive device and, in combination, a torque transmitting mechanism connecting one of said members with said rotatable drive device in torque transmitting relation including means for preventing transverse forces from being transmitted to said members from said drive device whereby said pressure seal at said interface is uninterrupted thereby substantially eliminating fluid leakage at said interface.

2. A hydraulic unit having a cylinder block member with a plurality of axially movable pistons in cooperative relation with a swash plate, a valve plate member abutting said cylinder block member in pressure seal relation forming an interface for valving fluid to and from said pistons, a rotatable drive device and, in combination, a torque transmitting mechanism connecting said cylinder block member with said rotatable drive device in torque transmitting relation including means for preventing transverse forces from being transmitted to said cylinder block member from said drive device whereby said pressure seal at said interface is uninterrupted thereby substantially eliminating fluid leakage at said interface.

3. A hydraulic unit having a cylinder block with a plurality of axially movable pistons in cooperative relation with a swash plate, a valve plate abutting said cylinder block in pressure seal relation forming an interface for valving fluid to and from said pistons, a rotative drive device and, in combination, a torque transmitting mechanism connecting said cylinder block with said drive device in torque transmitting relation comprising a first member mounted on said cylinder block and a second member mounted on said drive device in axial spaced relation, an intermediate element positioned between said members, first means disposed on one of said members and said element positioned for transmitting torque between said element and said one member, second means disposed on the other of said members and said element positioned for transmitting torque between said element and said other member, said first and second means being adapted to prevent transmission of transverse forces from said drive device to said cylinder block whereby said pressure seal at said interface is uninterrupted thereby substantially eliminating fluid leakage at said interface.

4. A hydraulic unit according to claim 3 wherein said first means comprises at least one axially extending first pin positioned in engaging relation with a complementary first groove for transmitting torque between said intermediate element and said one member and said second means comprises at least one axially extending second pin positioned in engaging relation with a complementary second groove for transmitting torque between said intermediate element and said other member.

5. A hydraulic unit according to claim 3 wherein said first means comprises a pair of axially extending first pins disposed in 180° relation with respect to each other in a first axial plane coincidental with the rotational axis of said one member and positioned in engaging relation with a complementary pair of first grooves for transmitting torque between said intermediate element and said one member, and said second means comprises a pair of axially extending second pins disposed in 180° relation with respect to each other in a second axial plane coincidental with the rotational axis of said other member and positioned in engaging relation with a complementary pair of second grooves for transmitting torque between said intermediate element and said other member for preventing the transmission of transverse forces between said members.

6. A hydraulic unit according to claim 5 wherein said first pins include first resilient elements in engaging relation with said first grooves for distributing uniformly the torque load on said first pins, and said second pins include second resilient elements in engaging relation with said second grooves for distributing uniformly the torque load on said second pins.

7. A hydraulic unit according to claim 6 wherein said resilient elements include sleeves constructed of resiliently yieldable plastic material.

8. A hydraulic unit having a cylinder block with a plurality of axially movable pistons in cooperative relation with a swash plate, a valve plate abutting said cylinder block in pressure seal relation forming an interface for valving fluid to and from said pistons, a rotatable drive device and, in combination, a torque transmitting mechanism connecting said cylinder block with said drive device in torque transmitting relation comprising a first annular member mounted on said drive device and a second annular member mounted on said cylinder block in axial spaced relation, an intermediate element disposed between said annular members, said intermediate element being positioned in axial spaced relation with respect to at least one of said annular members, at least one axial first groove means disposed on said intermediate element, first pin means mounted on said first annular member and extending axially into engagement with said first groove means for transmitting torque between said drive device and said intermediate element, at least one axial second groove means disposed on said second annular member, second pin means mounted on said intermediate element and extending axially into engagement with said second groove means for transmitting torque between said cylinder block and said intermediate element, said pin means and said groove means being adapted to prevent transmission of transverse forces from said drive device to said cylinder block whereby said pressure seal at said interface is uninterrupted thereby substantially eliminating fluid leakage at said interface.

9. A hydraulic unit having a cylinder block with a plurality of axially movable pistons in cooperative relation with a swash plate, a valve plate abutting said cylinder block in pressure seal relation forming an interface for valving fluid to and from said pistons, a rotative device and, in combination, a torque transmitting mechanism connecting said cylinder block with said drive device in torque transmitting relation comprising a first annular member mounted on said drive device and a second annular member mounted on said cylinder block in axial spaced relation, an intermediate element disposed between said annular members, said intermediate element being positioned in axial spaced relation with respect to at least one of said annular members, a pair of axially extending first pins mounted on said first annular member and disposed in 180° relation with respect to each other in a first axial plane coincidental with the rotational axis of said first annular member, a complementary pair of first axial grooves disposed in said intermediate element positioned in engaging relation with said pair of first pins for transmitting torque between said drive device and said intermediate element, a pair of second axial grooves disposed on said second annular member in 180° relation with respect to each other in a second axial plane, coincidental with the rotational axis of said second annular member and perpendicular to said first axial plane, and a pair of axially extending second pins mounted on said intermediate element positioned in engaging relation with said pair of second grooves for transmitting torque between said cylinder block and said intermediate element whereby transverse forces urging deflection of said drive device are prevented from being transmitted to said cylinder block thereby substantially eliminating fluid leakage at said interface.

10. A hydraulic unit according to claim 9 wherein first pins include first resilient elements in engaging relation with said first grooves for distributing uniformly the torque load on said first pins and said second pins include second resilient elements in engaging relation with said second grooves for distributing uniformly the torque load on said second pins.

11. A hydraulic unit according to claim 10 wherein said resilient elements are sleeves constructed of resiliently yieldable plastic material.

12. An infinitely variable speed ratio hydromechanical power transmission having a power input shaft connected to at least one hydraulic pump unit and a power output shaft connected to at least one hydraulic motor unit, each of said hydraulic units having a cylinder block with a plurality of axially movable pistons in cooperative relation with a swash plate, and a valve plate abutting said block in pressure seal relation forming an interface for valving fluid to and from said cylinder block, said hydraulic units being interconnected for hydromechanically transmitting power from said input shaft to said output shaft, at least one of said hydraulic units having a rotatable cylinder block and a bell-shaped drive element connected to one of said shafts in drive relation; a torque transmitting mechanism for connecting said rotatable cylinder block with said bell-shaped drive element in torque transmitting relation comprising, in combination, a first member mounted on said rotatable cylinder block and a second member mounted on said bell-shaped drive element in axial spaced relation, an intermediate element positioned between said members, first means disposed on one of said members and said intermediate element positioned for transmitting torque between said intermediate element and said one member, second means disposed on the other of said members and said intermediate element positioned for transmitting torque between said intermediate element and said other member, said first and second means being adapted to prevent transmission of transverse forces from said bell-shaped drive element to said rotatable cylinder block whereby said pressure seal at said interface is uninterrupted thereby substantially eliminating fluid leakage at said interface.

13. An infinitely variable speed ratio hydromechanical power transmission according to claim 12 wherein said first means comprises at least one axially extending first pin in engaging relation with a complementary first groove for transmitting torque between said intermediate element and said one member, and said second means comprises at least one axially extending second pin positioned in engaging relation with a complementary second groove for transmitting torque between said intermediate element and said other member.

14. An infinitely variable speed ratio hydromechanical power transmission according to claim 12 wherein said first means comprises a pair of axially extending first pins disposed in 180° relation with respect to each other in a first axial plane coincidental with the rotational axis of said one member and positioned in engaging relation with a complementary pair of first grooves for transmitting torque between said intermediate element and said one member, and said second means comprises a pair of axially extending second pins disposed in 180° relation with respect to each other in a second axial plane coincidental with rotational axis of said other member and positioned in engaging relation with a complementary pair of second grooves for transmitting torque between said intermediate element and said other member for preventing the transmission of transverse forces between said members.

15. An infinitely variable speed ratio hydromechanical power transmission according to claim 14 wherein said first pins include first resilient elements in engaging relation with said first grooves for distributing uniformly the torque load on said first pins, and said second pins include second resilient elements in engaging relation with said second grooves for distributing uniformly the torque load on said second pins.

16. An infinitely variable speed ratio hydromechanical power transmission according to claim 15 wherein said resilient elements include sleeves constructed of resiliently yieldable plastic material.

17. An infinitely variable speed ratio hydromechanical power transmission having a power input shaft connected to at least one hydraulic pump unit and a power output shaft connected to at least one hydraulic motor unit, each of said hydraulic units having a cylinder block with a plurality of axially movable pistons in cooperative relation with a swash plate, and a valve plate abutting said block in pressure seal relation forming an interface for valving fluid to and from said cylinder block, said hydraulic units being interconnected for hydromechanically transmitting power from said input shaft to said output shaft, at least one of said hydraulic unit having a rotatable cylinder block and a bell-shaped drive element connected to one of said shafts in drive relation; a torque transmitting mechanism for connecting said rotatable cylinder block with said bell-shaped drive element in torque transmitting relation comprising, in combination, a first annular member mounted on said bell-shaped drive element and a second annular member mounted on said rotatable cylinder block in axial spaced relation, an intermediate element disposed between said annular members, said intermediate element being positioned in axial spaced relation with respect to at least one of said annular members, a pair of axially extending first pins mounted on said first annular member and disposed in 180° relation with respect to each other in a first axial plane coincidental with the rotational axis of said first annular member, a complementary pair of first axial grooves disposed in said intermediate element positioned in engaging relation with said pair of first pins for transmitting torque between said bell-shaped drive element and said intermediate element, a pair of second axial grooves disposed on said second annular member in 180° relation with respect to each other in a second axial plane coincidental with the rotational axis of said second annular member and perpendicular to said first axial palne, and a complementary pair of axially extending second pins mounted on said intermediate element positioned in engaging relation with said pair of second grooves for transmitting torque between said rotatable cylinder block and said intermediate element whereby transverse forces urging deflection of said bell-shaped drive unit are prevented from being transmitted to said cylinder block thereby substantially eliminating fluid leakage at said interface.

18. An infinitely variable speed ratio hydromechanical power transmission according to claim 17 wherein said first pins include first resilient elements in engaging relation with said first grooves for distributing uniformly the torque load on said first pins, and said second pins include second resilient elements in engaging relation with said second grooves for distributing uniformly the torque load on said second pins.

19. An infinitely variable speed ratio hydromechanical power transmission according to claim 17 wherein said resilient elements include sleeves constructed of resiliently yieldable plastic material.

20. An infinitely variable speed ratio hydromechanical power transmission according to claim 19 wherein said resiliently yieldable plastic material is synthetic buna N rubber.

References Cited by the Examiner

UNITED STATES PATENTS

| | | | |
|---|---|---|---|
| 2,706,384 | 4/1955 | Schott | 60—53 |
| 2,776,628 | 1/1957 | Keel | 103—162 |
| 3,175,363 | 3/1965 | Molly | 60—53 |

EDGAR W. GEOGHEGAN, *Primary Examiner.*